United States Patent Office 3,136,739
Patented June 9, 1964

3,136,739
SYNTHETIC RUBBER COMPOSITIONS
Stephen Adamek and Edward Allan Dudley, Toronto, Ontario, Canada, assignors to Dunlop Rubber Company Limited, London, England, a British company
No Drawing. Filed May 26, 1960, Ser. No. 31,844
Claims priority, application Great Britain June 8, 1959
15 Claims. (Cl. 260—45.5)

This invention relates to synthetic rubber compositions and in particular to compositions comprising a high viscosity butyl rubber or olefine copolymer rubber. By "butyl rubber" we mean a copolymer of an iso-olefine, usually isobutylene, with a small proportion, usually less than 5%, of a di-olefine such as butadiene and isoprene.

Butyl rubber has the advantage of being cheap and of having a high degree of impermeability to air. On the other hand it is somewhat slow-curing, and also its tensile properties may not be so good as can be desired unless its viscosity is high; such high viscosities, however, reduce processability.

The olefine copolymer rubbers also have this last disadvantage.

It is an object of the present invention to provide rubber compositions which shall be capable of being easily processed yet which shall have tensile properties approaching or equalling those of high viscosity butyl rubber or olefine copolymer rubber, and which shall also be easily cured.

According to the invention a butyl rubber is blended with an olefine copolymer rubber of a broadly similar degree of unsaturation but of very different viscosity, the butyl rubber and the olefine copolymer rubber being in relative proportions between about 70:30 and 40:60, and the relative proportions of the butyl rubber and olefine copolymer rubber being so correlated with their respective viscosities that the blend has a Mooney viscosity of 40–60 (ML-8 at 125° F.). Thus a high viscosity butyl rubber (Mooney viscosity above 65 and preferably above 70, e.g. 70–85) can be blended with a low viscosity olefine copolymer rubber (Mooney viscosity below 40 and preferably below 30, e.g. 20–30), or a high viscosity olefine copolymer rubber (Mooney viscosity above 65 or preferably above 70, e.g. 70–100) can be blended with a low viscosity butyl rubber (Mooney viscosity below 50, e.g. 40–50). Blends containing about equal parts of the two components, say about 45 percent to 55 percent of butyl rubber and the corresponding proportion of the olefine copolymer rubber, are particularly useful. It is remarkable that in the blends of the invention the tensile properties approach or equal those of the high viscosity butyl rubber or olefine copolymer rubber alone, while the blends are considerably more easily processed and have improved tack, especially equipment tack.

As the butyl rubber component it is preferable to use a copolymer of isobutylene (95 percent to 99.5 percent) with 1,3-butadiene and/or isoprene (5 percent to 0.5 percent).

The olefine copolymer rubber may be a copolymer of one or more mono-olefines, preferably containing 2–10 carbon atoms, with a compound containing more than one ethylenic double bond especially a system of conjugated double bonds, which can be, for example butadiene, isoprene or cyclopentadiene, but is preferably an unsaturated endocyclic hydrocarbon containing at least one and preferably two or more ethylenic double bonds. Examples of such hydrocarbons are unsaturated derivatives of bicyclo-(2,2,1)-heptane including norbornene and bicyclopentadiene (1,4-endomethylenehydrind-2,6-diene); unsaturated derivatives of bicyclo-(2,2,2)-octane including bicyclo-(2,2,2)-octa-2,5-diene; and unsaturated derivatives of bicyclo-(3,2,1)-octane, bicyclo-(3,3,1)-nonane and bicyclo-(3,2,2)-nonane. Further examples of suitable endocyclic hydrocarbons, and instructions for the production of the copolymers, will be found in application Serial No. 748,165 filed July 14, 1958. Terpolymers of ethylene, propylene and dicyclopentadiene, especially such as contain 40 percent to 50 percent of propylene and 2 percent to 4 percent, unsaturation, are especially useful. (It will of course be understood that the term "copolymer" as used in this specification is not restricted to two component systems.)

The precise relationship between the degree of unsaturation of the butyl rubber and that of the olefine copolymer rubber is not important, so long as both are sufficient for effective vulcanisation, say 0.75 percent or above. Generally speaking both may usefully be between 0.75 percent and 4 percent, and will then be regarded as "broadly similar" for the purpose of this specification.

The novel blends of the invention can be cured with sulphur in the usual way, but it has been found that a product having better physical properties is usually obtained by promoting the sulphur cure by addition of a small quantity, e.g. 0.25 percent to 2 percent of one of the known peroxide curing agents, especially dicumyl peroxide. This easy curability of the blends is surprising in view of the fact that it has not heretofore been practicable to co-vulcanize butyl rubber with other rubbers without first modifying it, for example by halogenation.

The invention is illustrated by the following examples:

*Example I*

In this example a blend in accordance with the invention was made and compared with two controls, one of the butyl rubber and one of the olefine copolymer rubber used in the blend. The butyl rubber was a polyisobutylene/isoprene rubber of Mooney viscosity 74 and containing 1.52 percent unsaturation; the olefine copolymer rubber was a terpolymer of ethylene, propylene and dicyclopentadiene containing 42 percent of propylene and 3.0 percent unsaturation and having a Mooney viscosity of 22.

Three compositions were made up as follows:

|  | A | B | C |
|---|---|---|---|
| Butyl rubber | 100 | 50 |  |
| Olefine copolymer |  | 50 | 100 |
| Furnace Black (HAF black) | 50 | 50 | 50 |
| Zinc oxide | 5 | 5 | 5 |
| Stearic acid | 2 | 2 | 2 |

100 parts each of A, B and C were milled with the following curing compositions:

|  | D | E |
|---|---|---|
| Tetramethylthiuram disulphide | 1 | 1 |
| Tellurium diethyl dithiocarbamate | 0.5 | 0.5 |
| Sulphur | 2 | 2 |
| Dicumyl peroxide |  | 1 |

The compounded rubbers were then cured at 320° F. for 30 minutes.

The physical properties of the blend and of the two controls are given in the following table:

| Curing recipe | Butyl rubber A | | Blend B | | Olefine copolymer C | |
|---|---|---|---|---|---|---|
|  | D | E | D | E | D | E |
| Modulus 300%, p.s.i | 1,695 | 1,470 | 1,650 | 1,720 | -------- | 1,300 |
| Tensile strength, p.s.i | 2,245 | 2,325 | 1,920 | 2,220 | 940 | 1,400 |
| Elongation, percent | 410 | 440 | 340 | 400 | 230 | 320 |
| Resilience, percent (tripsometer) | -------- | 36 | -------- | 46 | -------- | 48 |
| Hardness (degrees) | 70–65 | 70–64 | 76–71 | 76–70 | 73–70 | 77–70 |

It will be apparent from the above figures that the inclusion of the low viscosity olefine copolymer rubber in the blends has had comparatively little effect on the tensile properties of the butyl rubber, but has considerably increased its resilience. Moreover the blend was more readily processable and curable than the butyl rubber.

*Example II*

In this example a blend based on a high viscosity olefine copolymer rubber was made and compared with two controls, one being the olefine copolymer rubber itself, and the other the butyl rubber used in the blend. The former was a copolymer of ethylene, propylene and dicyclopentadiene containing 37 percent of propylene and about 2 percent unsaturation, and having a Mooney viscosity of 75. The butyl rubber was a relatively low molecular weight copolymer of isobutylene and isoprene containing 2.09 percent unsaturation and having a Mooney viscosity of 45.

Three compositions were made up as follows:

|  | A | B | C |
|---|---|---|---|
| Olefine copolymer | 100 | 50 | -------- |
| Butyl rubber | -------- | 50 | 100 |
| Furnace Black (HAF black) | 50 | 50 | 50 |
| Zinc oxide | 5 | 5 | 5 |
| Stearic acid | 2 | 2 | 2 |
| Mineral processing oil | 15 | -------- | -------- |

100 parts each of A, B and C were milled with the curing compositions D and E of Example I and the compounded rubbers cured for 30 minutes at 320° F.

The physical properties of the blend and of the two controls are given in the following table:

| Curing recipe | Olefine copolymer A | | Blend B | | Butyl rubber C | |
|---|---|---|---|---|---|---|
|  | D | E | D | E | D | E |
| Modulus 300%, p.s.i | 1,150 | 1,400 | 1,630 | 1,600 | 1,610 | 1,775 |
| Tensile strength, p.s.i | 2,500 | 3,100 | 2,410 | 2,600 | 2,120 | 1,925 |
| Elongation, percent | 550 | 525 | 430 | 440 | 410 | 320 |
| Hardness (degrees) | 73–70 | 69–66 | 70–65 | 73–70 | 73–70 | 72–68 |

While the inclusion of the low viscosity butyl rubber in the blend has had comparatively little effect on the tensile properties of the olefine copolymer rubber, the blend was more easily curable and much more readily processable than the olefine copolymer rubber alone, which indeed could not be satisfactorily processed without at least about 15 parts (per hundred parts of rubber) of a processing oil.

*Example III*

In this example also a blend based on a high viscosity olefine copolymer rubber was made and compared with the two components of the blend taken singly. The olefine copolymer was similar to that of Example II, except that it had a Mooney viscosity of 97 and about 1 percent unsaturation. The butyl rubber was an isobutylene-isoprene copolymer having a Mooney viscosity of 45 and 2.1 percent unsaturation.

Three compositions were made up as follows:

|  | A | B | C |
|---|---|---|---|
| Olefine copolymer | 100 | 50 | -------- |
| Butyl rubber | -------- | 50 | 100 |
| Furnace Black (HAF black) | 50 | 50 | 50 |
| Zinc oxide | 5 | 5 | 5 |
| Stearic acid | 2 | 2 | 2 |
| Tetramethylthiuram disulphide | 1 | 1 | 1 |
| Tellurium diethyldithiocarbamate | 0.5 | 0.5 | 0.5 |

These compositions after curing for 30 minutes at 307° F. gave rubber having the following properties:

|  | Olefine Blend A | Blend B | Butyl rubber C |
|---|---|---|---|
| Modulus 300%, p.s.i | 1,160 | 1,540 | 1,900 |
| Tensile strength, p.s.i | 1,760 | 2,400 | 2,040 |
| Elongation, percent | 450 | 460 | 305 |
| Hardness (degrees) | 71 | 72 | 73 |
| Cold tear, 70° F. (Crescent), p.i | 330 | 340 | 250 |
| Hot tear, 212° F. (Crescent), p.i | 90 | 180 | 140 |
| Rebound resilience at 70° F | 62.5 | 57.5 | 35.0 |

In this example the tensile strength of the blend is better than that of either component, the tear strength is also improved and the resilience of the butyl rubber is increased by the incorporation of the olefine copolymer having the high Mooney viscosity. At the same time the processability of the olefine copolymer is improved by blending with the butyl rubber.

We claim:
1. A blend of an uncured butyl rubber which is a copolymer of an iso-olefine with less than 5% of a diolefine, with an uncured olefine copolymer rubber which is a copolymer of at least one straight chain monoolefine with a compound containing at least two ethylenic double bonds, in which both rubbers have a degree of unsaturation between 0.75 and 4 percent, the relative proportions of the butyl rubber and the olefine copolymer rubber in the blend being between 70:30 and 40:60, the butyl rubber having a Mooney Viscosity below 50 and the olefine copolymer rubber having a Mooney Viscosity above 65, and the relative proportions of the butyl rubber and olefine copolymer rubber being so correlated with their viscosities that the blend has a Mooney viscosity of 40–60.
2. A blend according to claim 1 wherein the butyl rubber has a Mooney viscosity of 40–50 and the olefine copolymer rubber has a Mooney viscosity of 70–100.
3. A blend according to claim 1, wherein the relative proportions of the butyl rubber and the olefine copolymer rubber are between 45:55 and 55:45.
4. A blend according to claim 1, wherein the butyl rubber is a copolymer of isobutylene (95 percent to 99.5 percent) with at least one conjugated diolefine selected from the group which consists of 1,3-butadiene and isoprene (5 percent to 0.5 percent).
5. A blend according to claim 1, wherein the olefine copolymer rubber is a copolymer of at least one monoolefine having 2–10 carbon atoms in the molecule with a hydrocarbon containing a system of at least two conjugated ethylenic double bonds.
6. A blend according to claim 5, wherein the said hydrocarbon is an unsaturated endocyclic hydrocarbon.
7. A blend according to claim 1, wherein the olefine copolymer rubber is a copolymer of ethylene, propylene and dicyclopentadiene containing 40 percent to 50 percent of propylene and 2 percent to 4 percent unsaturation.
8. A blend according to claim 1, containing also sulphur as a curing agent.
9. A blend according to claim 8, containing also a peroxide curing agent.
10. A blend according to claim 9, containing 0.25 percent to 2 percent of dicumyl peroxide.

11. A blend of an uncured butyl rubber which is a copolymer of isobutylene (95 percent to 99.5 percent) with at least one conjugated diolefine selected from the group which consists of 1,3-butadiene and isoprene (5 percent to 0.5 percent) with an uncured olefine copolymer rubber which is a copolymer of at least one straight chain mono-olefine having 2–10 carbon atoms in the molecule with a hydrocarbon containing a system of at least two conjugated ethylenic double bonds in which both rubbers have a degree of unsaturation between 0.75 percent and 4 percent, the relative proportions of the butyl rubber and the olefin copolymer rubber being between 45:55 and 55:45, the butyl rubber having a Mooney viscosity of 40–50 and the olefine copolymer rubber a Mooney viscosity of 70–100, and the relative proportions of the butyl rubber and the olefine copolymer rubber being so correlated with their viscosities that the blend has a Mooney viscosity of 40–60.

12. A blend according to claim 11, wherein the olefine copolymer rubber is a copolymer of ethylene, propylene and dicyclopentadiene containing 40 percent to 50 percent of propylene and 2 percent to 4 percent unsaturation.

13. A blend according to claim 12 containing also sulphur as a curing agent and 0.25 percent to 2 percent of dicumyl peroxide.

14. Process for the production of a cured synthetic rubber, which comprises heating until a cure has been effected a blend as claimed in claim 8.

15. Process for the production of a cured synthetic rubber, which comprises heating until a cure has been effected a blend as claimed in claim 13.

References Cited in the file of this patent

UNITED STATES PATENTS

| | | |
|---|---|---|
| 2,213,423 | Wiezevich | Sept. 3, 1940 |
| 2,615,881 | Sparks et al. | Oct. 28, 1952 |
| 2,809,372 | Frederick et al. | Oct. 8, 1957 |
| 2,969,341 | Buckley et al. | Jan. 24, 1961 |

FOREIGN PATENTS

| | | |
|---|---|---|
| 1,079,146 | Germany | Apr. 7, 1960 |
| 203,833 | Australia | Oct. 5, 1956 |